US006755663B2

(12) United States Patent
Lee

(10) Patent No.: US 6,755,663 B2
(45) Date of Patent: Jun. 29, 2004

(54) APPARATUS AND METHODS FOR CONNECTING AN ELECTRONIC DEVICE TO A MOBILE PLATFORM COMMUNICATIONS NETWORK

(75) Inventor: Donald B. Lee, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/947,175

(22) Filed: Sep. 5, 2001

(65) Prior Publication Data

US 2003/0045132 A1 Mar. 6, 2003

(51) Int. Cl.[7] .............................................. H01K 33/00
(52) U.S. Cl. ...................................... 439/34; 439/534
(58) Field of Search ............................ 439/34, 36, 534, 439/164

(56) References Cited

U.S. PATENT DOCUMENTS

| 5,177,616 | A | * | 1/1993 | Riday ......................... 248/917 |
| 5,195,709 | A | * | 3/1993 | Yasushi ................... 248/280.11 |
| 5,271,590 | A | * | 12/1993 | Rosen .................... 248/222.13 |
| 5,316,369 | A | * | 5/1994 | Kanda .................... 297/188.15 |
| 5,555,491 | A | * | 9/1996 | Tao .......................... 248/185.1 |
| 5,590,022 | A | * | 12/1996 | Harvey ........................ 206/576 |
| 5,636,211 | A | * | 6/1997 | Newlin et al. .............. 370/465 |
| 5,822,546 | A | * | 10/1998 | George ....................... 708/130 |
| 5,984,415 | A | | 11/1999 | Schumacher et al. |
| 6,158,793 | A | | 12/2000 | Castro |
| 6,249,913 | B1 | | 6/2001 | Galipeau et al. |

FOREIGN PATENT DOCUMENTS

EP 0 368 609 5/1990
EP WO 00/14987 3/2000

OTHER PUBLICATIONS

The American Heritage Dictionary of the English Language, Third Edition copyright 1992 by Houghton Mifflin Company. Electronic version licensed from INSO Corporation.*
Jennifer Michaels/JenMichels@erols.com; TechNews.com; Washington Techway; The last great frontier; XP-002219032; Mar. 26, 2001.
Emma Kelly/London; In-Flight Entertainment; Spinning an airborne web; XP-000969418; Sep. 12-18, 2000.
Dirk Spiers; Business; The Conference Spy; XP-002219033; Jun. 21, 2001.
Steven Meloan; java.sun.com; JAVA Technology Takes to the Sky; XP-002219034; Nov. 22, 2000.
International Search Report; ISA/EPO, Nov. 12, 2002.

* cited by examiner

Primary Examiner—Tho D. Ta
Assistant Examiner—James R. Harvey
(74) Attorney, Agent, or Firm—Harness Dickey & Pierce, P.L.C.

(57) ABSTRACT

An apparatus for connecting an electronic device to a communications system to provide access via the device to a user in a seat on a mobile platform. A jack is pivotally attached to one end of a gooseneck assembly and receives a connector of the electronic device. Another end of the gooseneck assembly is pivotally attached to a pivot for an armrest of the seat. An interface cable extends through the gooseneck assembly and electrically connects the jack with a system connector near the seat. The gooseneck assembly is easily accessible and visible to passengers.

10 Claims, 2 Drawing Sheets

APPARATUS AND METHODS FOR CONNECTING AN ELECTRONIC DEVICE TO A MOBILE PLATFORM COMMUNICATIONS NETWORK

FIELD OF THE INVENTION

The present invention relates generally to apparatus for connecting electronic devices to communication networks and, more particularly, to an apparatus for connecting an electronic device to a communications network accessible in a mobile platform.

BACKGROUND OF THE INVENTION

Broadband data and video services have not been widely available to users on mobile platforms such as aircraft, boats, trains, and automobiles. Mobile network systems have traditionally been limited in bandwidth and link capacity, making it prohibitively expensive and/or unacceptably slow to distribute such services to all passengers on a mobile platform.

A system for supplying television and data services to mobile platforms, described in co-pending U.S. patent application Ser. No. 09/639,912, provides bi-directional data transfer via satellite communications link between a ground-based control segment and a mobile RF transceiver system carried on each mobile platform. Each user on each mobile platform is able to interface with an onboard server by using, for example, a laptop computer. Each user can independently request and obtain Internet access, company intranet access and live television programming.

It would be desirable to provide each seated passenger with an easily accessible connection to such a network. It also would be desirable to directly illuminate, for example, a keyboard of a laptop computer while a passenger is using it to access the network.

SUMMARY OF THE INVENTION

In one preferred form, the present invention provides an apparatus for connecting an electronic device such as a laptop computer to a communications system, to provide system access via the device to a user in a seat on a mobile platform. The system is accessible via a system connector near the seat. The apparatus includes a gooseneck assembly having first and second ends. A jack is pivotally attached to the first end and configured to receive a connector of the electronic device. The second end is pivotally attached to a pivot for an armrest of the seat. An interface cable extends through the gooseneck assembly and electrically connects the system connector with the jack.

The above-described apparatus allows an airline to provide a network connection at each passenger seat so that passengers may use their laptop computers or other electronic devices to access a communications network during flight. The gooseneck assembly is easily accessible and visible to passengers.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawing, wherein.

DETAILED DESCRIPTION OF THE PREFERRED EMBODIMENTS

The following description of the preferred embodiments is merely exemplary in nature and is in no way intended to limit the invention, its application, or uses. Although embodiments of the invention are described herein in connection with aircraft, embodiments of the invention can be used in connection with other mobile platforms such as buses, ships and trains.

Figure 1:
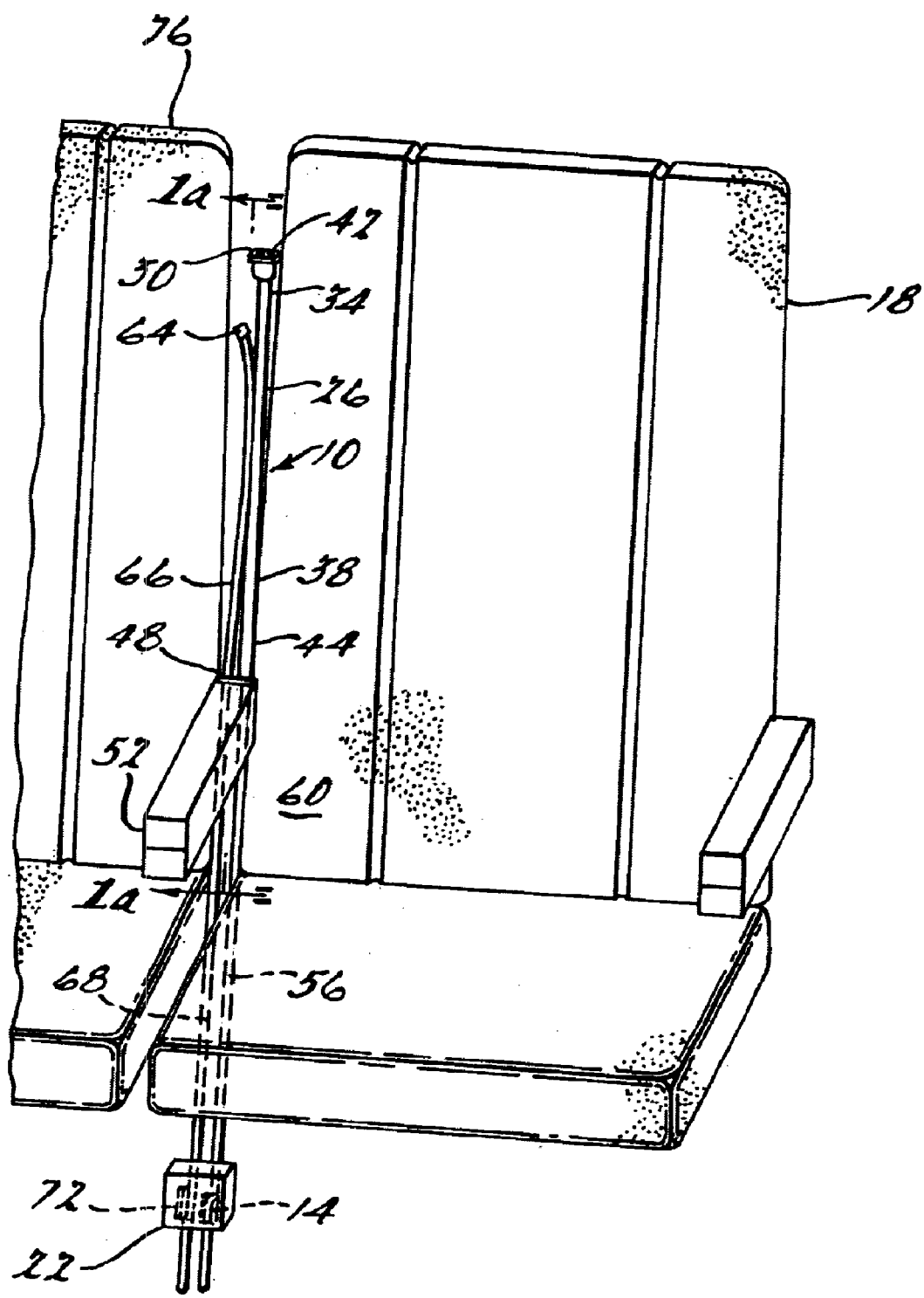
FIG. 1 is a frontal view of a pair of aircraft passenger seats between which is implemented an embodiment of an apparatus for connecting an electronic device to a communications system in accordance with principles of the present invention.
Figure 1A:
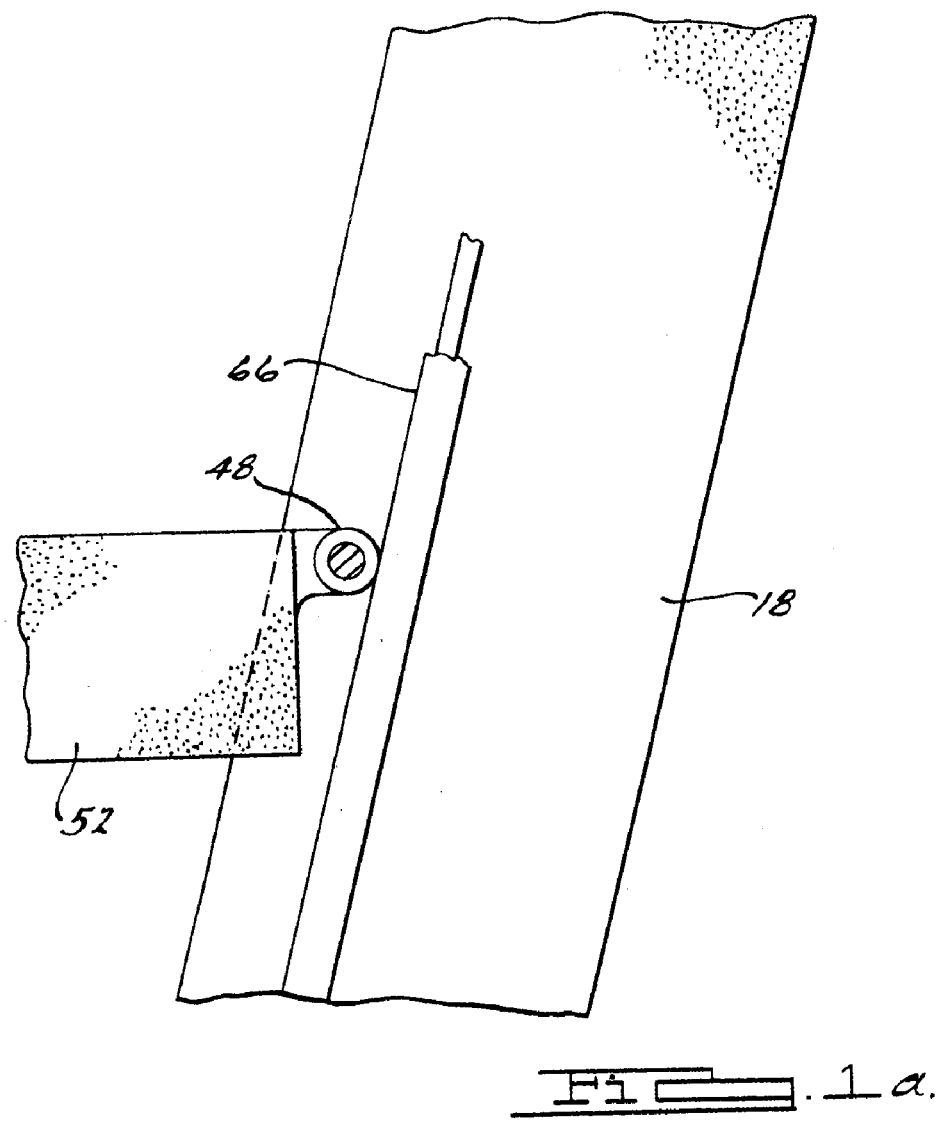
FIG. 1A is a partial enlarged perpective view of an armrest.

FIGS. 1 and 1A illustrates an apparatus 10 for connecting an electronic device such as a laptop (not shown) to a communications system accessible, for example, by passengers on board an aircraft. Such a system in one embodiment is described in co-pending U.S. patent application Ser. No. 09/639,912, the disclosure of which is incorporated herein in its entirety by reference. The system is accessible via a system connector 14 near a passenger seat 18. As shown in the FIGURE, the system connector 14 is situated inside a junction box 22 located beneath a floor panel (not shown) of the aircraft, although the system connector 14 could be installed in another location.

The apparatus 10 includes a gooseneck assembly 26 having a head 30 pivotally attached to an upper end 34 of a flexible and positionable neck 38. The head 30 includes a jack 42 configured to receive a connector cable (not shown) of the electronic device. In one embodiment the jack 42 is an RJ-45 connector for attachment of a laptop computer thereto, to provide an Ethernet connection between the laptop and the communications system.

A lower end 44 of the neck 38 is attached adjacent to a pivot 48 for an armrest 52 of the seat 18. The pivot 48 is structured such that the gooseneck assembly 26 can be pivoted without moving the armrest 52, and the armrest 52 can be pivoted without moving the gooseneck assembly 26. An interface cable 56 extends through the gooseneck assembly 26 and electrically connects the system connector 14 with the jack 42. The interface cable 56 is electrically shielded and extends through a portion of the seat 18, for example, underneath a seat cover 60 and into the junction box 22 for connection with the system connector 14.

In the embodiment shown in FIGS 1 and 1A, the apparatus 10 also includes a light source 64 mounted atop a flexible stalk 66. The stalk 66 is attached adjacent to the pivot 48 and pivots independently of the gooseneck assembly 26 and the armrest 52. The light source 64 is connected via a light cable 68 to a power source or connection 72, for example, in the junction box 22. In an alternative embodiment, the light source 64 is mounted on the head 30 of the gooseneck assembly 26 and is pivotable independently of the jack 42. When not in use, the gooseneck assembly 26 and/or the light source 64 can be positioned in a predominantly vertical and/or a recessed position, for example, recessed between the seat 18 and an adjacent seat 76. When a passenger desires to connect an electronic device to the communications system, he or she lowers the gooseneck assembly 26 and inserts a connector cable (not shown and which can be passenger-supplied) between the electronic device and the jack 42. The passenger can adjust the head 30 and neck 38 of the gooseneck assembly 26 to a convenient position.

The passenger also can lower the light source 64 and flex the stalk to aim the light source 64, for example, directly upon a keyboard of the electronic device. The gooseneck assembly 26 and the light source 64 can be used together, and each can be used alone without the other. When no longer in use, the gooseneck assembly 26 and/or the light source 64 can be returned to their respective recessed positions.

The above-described apparatus allows an airline to provide a network connection at each passenger seat so that passengers may use their laptop computers or other electronic devices to access a communications network during flight. The gooseneck assembly, although easily accessible and visible to passengers, can be kept out of the way of passengers when not in use. When using an embodiment including a light source, a passenger can illuminate a laptop or other device directly and easily. The above apparatus is easily installed and maintained in any mobile platform passenger seating, including airline economy, business and first class seating.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for connecting an electronic device such as a laptop computer to a communications system to provide system access via the device to a user in a seat on a mobile platform, the system being accessible via a system connector near the seat, the apparatus comprising:

a gooseneck assembly comprising first and second ends and a jack attached to the first end and configured to receive a connector of the electronic device, the second end attached adjacent to a pivot for an armrest of the seat, the gooseneck assembly configured to at least substantially reside adjacent a side of the seat without interfering with a use of the armrest associated with the seat;

an interface cable extending through the gooseneck assembly and electrically connecting the system connector with the jack;

the gooseneck assembly is able to at least substantially reside adjacent a side of the seat without interfering with a use of the armrest associated with the seat; and wherein the use of the armrest includes pivoting the armrest without moving the gooseneck assembly.

2. The apparatus of claim 1 wherein the interface cable extends through at least a portion of the seat.

3. The apparatus of claim 1 wherein the gooseneck assembly is pivotable about the pivot without moving the seat armrest.

4. The apparatus of claim 1 wherein the communications system comprises an Ethernet network and the jack is configured to receive an Ethernet connector of the electronic device.

5. The apparatus of claim 1 further comprising a light source adapted to move about the pivot.

6. The apparatus of claim 5 wherein the light source is moveable independently of the jack.

7. The apparatus of claim 1 wherein the interface cable comprises electrical shielding.

8. An apparatus for connecting an electronic device such as a laptop computer to a communications system to provide system access via the device to a user in a seat on a mobile platform, the system being accessible via a system connector near the seat, the apparatus comprising:

a gooseneck assembly comprising first and second ends and a jack attached to the first end and configured to receive a connector of the electronic device, the second end attached adjacent to a pivot for an armrest of the seat;

an interface cable extending through the gooseneck assembly and at least closely adjacent to a portion of the seat, and electrically connecting the system connector with the jack;

the gooseneck assembly is able to at least substantially reside adjacent a side of the seat without interfering with a use of the armrest associated with the seat; and wherein the use of the armrest comprises pivoting the armrest without moving the gooseneck assembly.

9. An apparatus for connecting an electronic device such as a laptop computer to a communications system to provide system access via the device to a user in a seat on a mobile platform, the system being accessible via a system connector near the seat, the apparatus comprising:

a gooseneck assembly comprising first and second ends and a jack attached to the first end and configured to receive a connector of the electronic device, the second end attached to a pivot for an armrest of the seat; and an interface cable extending through the gooseneck assembly and electrically connecting the system connector with the jack;

wherein the gooseneck assembly is able to move about the pivot without moving the seat armrest and the seat armrest is able to pivot without moving the gooseneck assembly.

10. An apparatus for connecting an electronic device such as a laptop computer to a communications system to provide system access via the device to a user in a seat on a mobile platform, the system being accessible via a system connector near the seat, the apparatus comprising:

a first gooseneck assembly comprising first and second ends and a jack attached to the first end and configured to receive a connector of the electronic device, the second end attached adjacent to a pivot for an armrest of the seat;

a second gooseneck assembly comprising first and second ends and a light source attached to the first end and the second end attached to a pivot for an armrest of the seat;

wherein the first and second gooseneck assemblies are able to at least substantially reside adjacent a side of the seat without interfering with the pivoting of the armrest associated with the seat.

* * * * *